US007800895B2

(12) United States Patent
Inoue et al.

(10) Patent No.: US 7,800,895 B2
(45) Date of Patent: Sep. 21, 2010

(54) ELECTRONIC APPARATUS AND SOUND INSULATING METHOD THEREOF

(75) Inventors: Akira Inoue, Tokyo (JP); Sumio Otsuka, Tokyo (JP); Norio Kobayashi, Tokyo (JP); Toru Yamauchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 354 days.

(21) Appl. No.: 11/854,810

(22) Filed: Sep. 13, 2007

(65) Prior Publication Data
US 2008/0078611 A1    Apr. 3, 2008

(30) Foreign Application Priority Data
Oct. 2, 2006    (JP)    ............... 2006-270617

(51) Int. Cl.
*H05K 7/20*    (2006.01)

(52) U.S. Cl. ............... 361/679.34; 361/679.33; 361/724; 181/206

(58) Field of Classification Search ............ 361/679.33
See application file for complete search history.

(56) References Cited

U.S. PATENT DOCUMENTS 5,508,477 A * 4/1996 Kato et al. ............... 181/205
5,783,780 A * 7/1998 Watanabe et al. ............ 181/229
5,792,999 A * 8/1998 Arnold et al. ............... 181/141
6,021,612 A * 2/2000 Dunn et al. .................... 52/144
6,198,627 B1 * 3/2001 Roehling et al. ............ 361/688
6,243,262 B1 * 6/2001 Koo et al. ............... 361/679.46
6,618,248 B1 * 9/2003 Dalheimer ............. 361/679.33
6,950,304 B2 * 9/2005 Suzuki et al. .......... 361/679.33
7,046,470 B2 * 5/2006 Yamanashi et al. ............ 360/69
7,161,801 B2 * 1/2007 Chen et al. .................. 361/690
7,281,605 B2 * 10/2007 Huff et al. .................... 181/250
7,364,012 B2 * 4/2008 White, Jr. .................... 181/250
2002/0144860 A1 * 10/2002 Galaitsis ..................... 181/232
2005/0122675 A1 * 6/2005 Cheng ........................ 361/685
2007/0230114 A1 * 10/2007 Bartell et al. ............... 361/687
2008/0078611 A1 * 4/2008 Inoue et al. ................. 181/206

FOREIGN PATENT DOCUMENTS
JP    2006-185571    7/2006

* cited by examiner

*Primary Examiner*—Jayprakash N Gandhi
*Assistant Examiner*—Anthony Q Edwards
(74) *Attorney, Agent, or Firm*—Oblon, Spivak, McClelland, Maier & Neustadt, L.L.P.

(57) ABSTRACT

An electronic apparatus includes a drive for recording/reproducing a recording medium, and a sound absorbing member having a Helmholtz resonator for insulating sounds at a predetermined frequency among sounds generated by the drive.

12 Claims, 14 Drawing Sheets

ELECTRONIC APPARATUS AND SOUND INSULATING METHOD THEREOF

BACKGROUND OF THE INVENTION

1. Field of the Invention

The present invention relates to an electronic apparatus equipped with a hard disk drive, typically a personal computer, for example, and a sound insulating method for the electronic apparatus of this type.

2. Description of Related Art

Personal computers and the like have used mainly hard disk drives as means for storing data. Because of a recent large capacity of data, a plurality of hard disk drives are mounted often on personal computers and the like. Further, in order to simplify mount/dismount of the hard disk drives, there is a demand for allowing a hard disk drive to be mounted/dismounted from a front side of a personal computer and the like.

If a plurality of hard disk drives are mounted on the front side of a personal computer, i.e., at a position near to a user, there arises an issue of noises generated from the hard disk drives. Especially, this noise issue is supposed to become more serious, because a housing of a recent personal computer or the like executing a process at high speed has a low sealing performance for taking cooling air into the casing to mitigate an inner large calorific value.

It has been proposed therefore to mount a sound insulating member such that it surrounds a hard disk drive (e.g., refer to Japanese Patent Application Publication No. JP 2006-185571 (Paragraph [0023], FIG. 3)).

SUMMARY OF THE INVENTION

However, simply disposing a sound insulating member to surround a hard disk drive is not enough for soundproofing when considering the number of mounted hard disk drives, front side mount, housing low sealing performance and the like described above. If a sufficient sound insulating performance is to be obtained by using the above-described sound insulating member, it can be considered that the hard disk drive including the sound insulating member becomes very large and heavy. This results in a reduced number of hard disk drives capable of being mounted on a personal computer or the like, and inconvenience of mounting/dismounting of the hard disk drives from the personal computer or the like.

The present invention is made in view of the above-described circumstance. According to embodiments of the present invention, there are provided an electronic apparatus capable of substantially reducing noises generated from a drive while keeping the drive compact and light, and a noise insulating method of the drive.

The present inventors have found that a drive typically a hard disk drive has a noise peak at a specific frequency, and that if noises at the peak are reduced, a user's feeling of noise can be reduced considerably. Reduction in the user's feeling of noise has a meaning of substantial reduction in noises.

According to an embodiment of the present invention, an electronic apparatus includes a drive for recording/reproducing a recording medium and a sound absorbing member having a Helmholtz resonator for absorbing sounds at a predetermined frequency among sounds generated by the drive.

According to the embodiment of the present invention, the sound absorbing member having a Helmholtz resonator is used which absorbs sounds at a predetermined frequency, e.g., sounds at a noise peak frequency, among sounds generated by the drive. A user's feeling of noises is thus reduced considerably, and it is therefore possible to substantially reduce noises generated from the drive while keeping the drive compact and light.

In the embodiment of the present invention, the drive may be a hard disk drive.

According to an embodiment of the present invention, since the hard disk drive has a peak of strong noise, especially at a specific frequency, it is particularly significant that noises are substantially reduced by using the noise absorbing member having the Helmholtz resonator.

In the embodiment of the present invention, the drive can be mounted/dismounted via an opening provided on a front side of the electronic apparatus, and the electronic apparatus may further include a first lid which covers the whole front side of the electronic apparatus and is removably mounted on the electronic apparatus, having the sound absorbing member provided on a plane facing the front side of the electronic apparatus.

According to the embodiment of the present invention, since the area of the first lid covering the whole front side of the electronic apparatus is very large, it is possible to provide the sound absorbing member with a greater number of Helmholtz resonators and to improve a sound absorbing performance. Further, since means exclusive for absorbing sounds is not provided to the drive, the drive can be kept compact and light.

In the embodiment of the present invention, a suction port may be provided on the front side of the electronic apparatus to introduce cooling air into the electronic apparatus and the electronic apparatus may further include a cooling fan disposed in the electronic apparatus near at the suction port.

According to the embodiment of the present invention, it is possible to enhance a cooling performance of the electronic apparatus, while substantially reducing noises.

In the embodiment of the present invention, the electronic apparatus may further include a second lid removably mounted on the opening on the front side of the electronic apparatus, and the second lid may be a metal lid or a plastic lid, for example.

According to the embodiment of the present invention, the second lid may reduce noises of low frequency components.

In the embodiment of the present invention, the drive can be mounted/dismounted via an opening provided on a front side of the electronic apparatus, and the electronic apparatus may further include a lid which can be mounted removably on the opening, having the sound absorbing member provided on a plane facing the opening.

According to the embodiment of the present invention, since the Helmholtz resonator is provided at a position nearer to the drive, noises can be reduced before noises are diffused and thus the sound absorbing performance may be improved. Further, since means exclusive for absorbing sounds is not provided to the drive, the drive can be kept compact and light.

In the embodiment of the present invention, the electronic apparatus may further include a case which accommodates the drive with the sound absorbing member placed in a plane facing the drive.

According to the embodiment of the present invention, since the Helmholtz resonator is provided at a position nearest to the drive, noises can be reduced most effectively before noises are diffused and thus the sound absorbing performance can be improved.

According to another embodiment of the present invention, a sound insulating mechanism of an electronic apparatus includes the steps of recording/reproducing a recording medium with a drive, and absorbing sounds at a predetermined frequency among sounds generated by the drive, with a Helmholtz resonator.

According to the embodiment of the present invention, a user's feeling of noise can be reduced considerably, and noises generated from the drive can be reduced substantially, while keeping the drive compact and light.

DETAILED DESCRIPTION OF THE EMBODIMENTS

Embodiments of the present invention will be described below with reference to the accompanying drawings.

Figure 1:
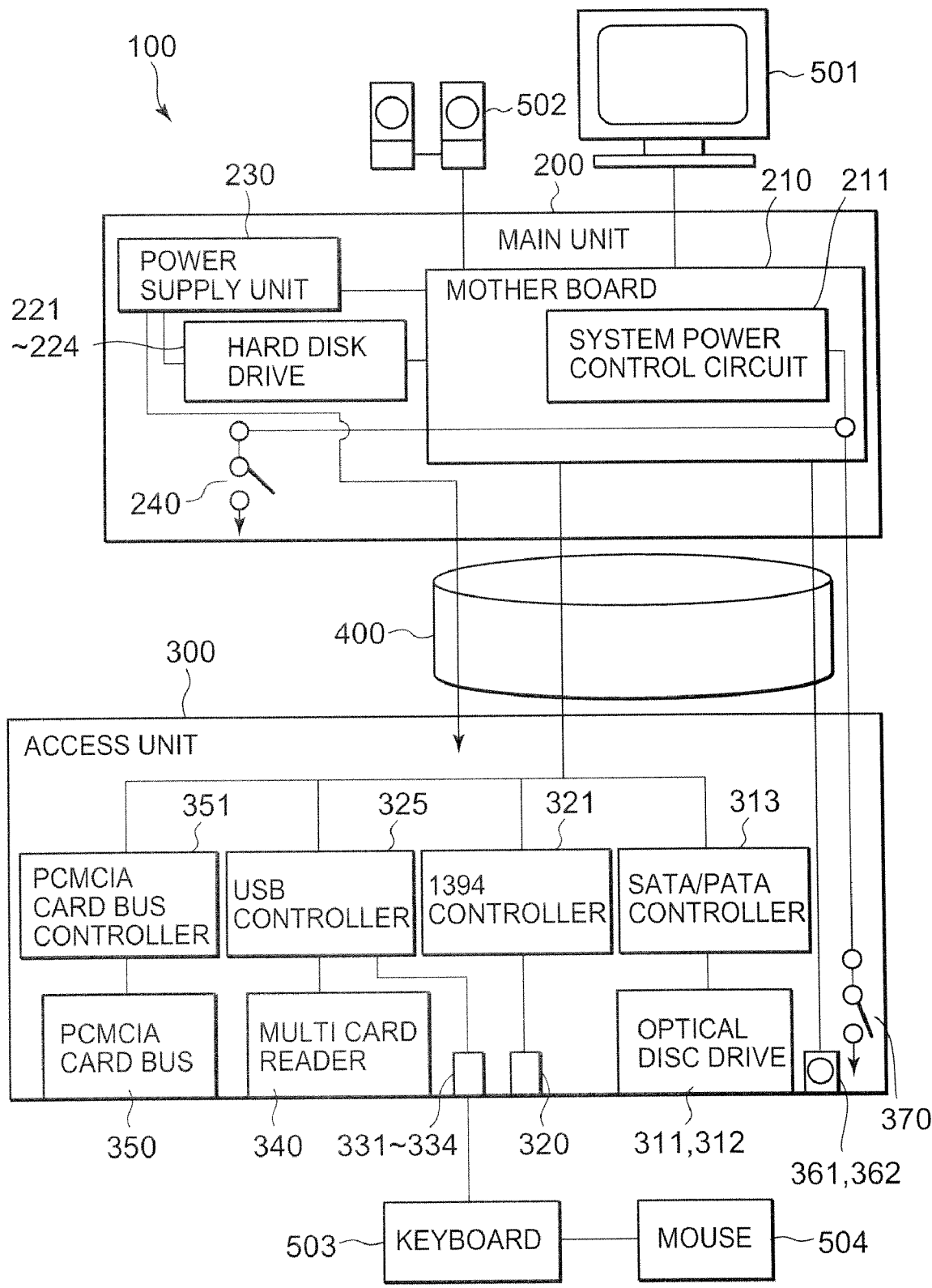
FIG. 1 is a block diagram showing the structure of a personal computer according to an embodiment of the present invention.

FIG. 1 is a block diagram showing the structure of a personal computer according to an embodiment of the present invention.

As shown in FIG. 1, the personal computer 100 has a main unit 200, an access unit 300 and a cable 400 for interconnecting the main unit 200 and access unit 300. In this personal computer 100, the main unit 200 and access unit 300 are mechanically separated, and electrically connected via the cable 400.

The main unit 200 includes a mother board 210 mounting a CPU or the like, hard disk drives 221 to 224 as drives (although not shown, four drives are used typically), a power supply unit 230 for supplying power to each component constituting the personal computer 100, and a first power switch 240 for setting the personal computer 100 to one of ON/OFF/STANDBY modes.

The mother board 210 has a system power control circuit 211 allowing the first power switch 240 and a second power switch on the side of the access unit 300 described later to perform same function, in other words, allowing the second power switch to function as a power switch for setting the personal computer 100 to one of ON/OFF/STANDBY modes.

The power supply unit 230 supplies power not only to each component of the main unit 200 but also to each component of the access unit 300 via the cable 400.

The access unit 300 has optical disc drives 311 and 312 (although not shown, two drives are used) to which an optical recording medium such as a CD or a DVD is loaded/unloaded, and which reads/writes data from/to the optical recording medium, an IEEE1394 port 320, USB ports 331 to 334 (although not shown, four ports are used), a multi card reader 340 for reading/writing data from/to a flash memory card of various portable types, a PCMCIA card bus 350 for reading/writing data from/to a PCMCIA card, a microphone terminal 362, a headphone terminal 361, and the second power switch 370 for setting the personal computer 100 to one of ON/OFF/STANDBY modes.

The optical disc drives 311 and 312 are connected via a SATA/PATA controller 313, the IEEE1394 port 320 is connected via a 1394 controller 321, the USB ports 321 to 324 and multi card reader 340 are connected via a USB controller 325, and the PCMCIA card 350 is connected via a PCMCIA card bus 351, respectively to the mother board 210 of the main unit 200.

A monitor 501 and a speaker 502 are connected to the main unit 200, and a keyboard 503 and a mouse 504 may be connected via the USB port to both of the main unit 200 and the access unit 300.

Figure 2:
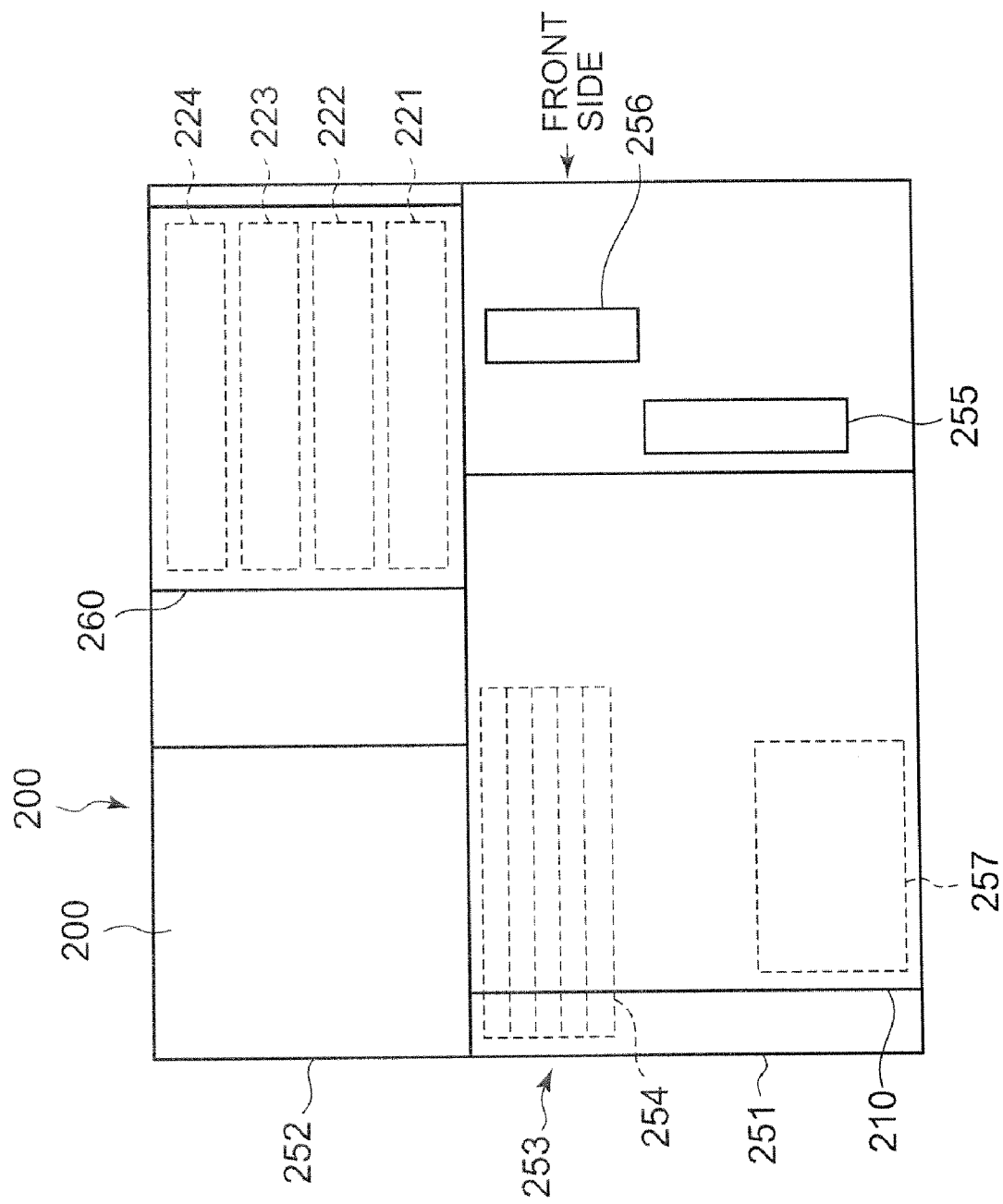
FIG. 2 is a plan view showing the internal structure of a main unit shown in FIG. 1.
Figure 3:
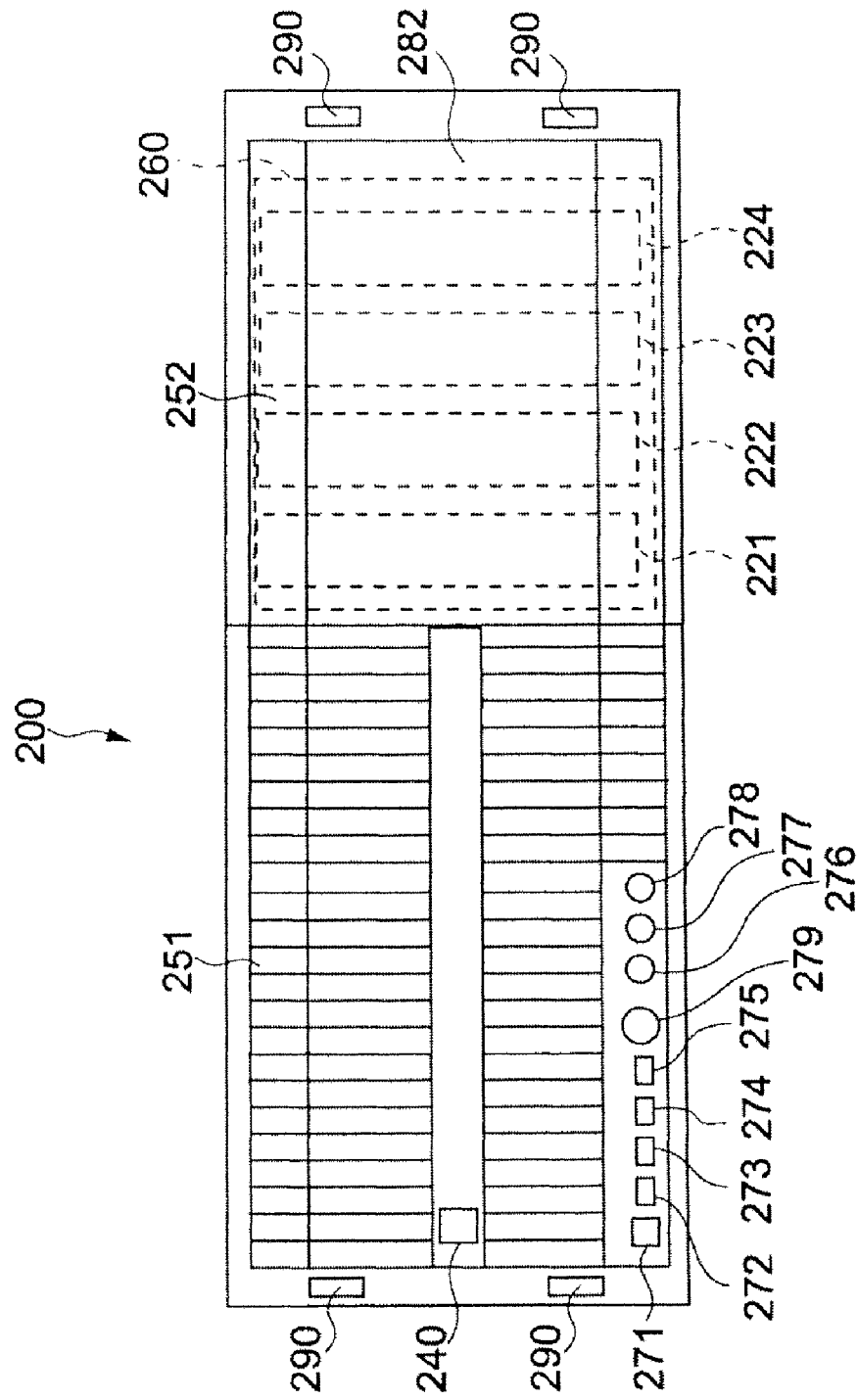
FIG. 3 is a front view of a main unit shown in FIG. 1.

FIG. 2 is a plan view showing the inner structure of the main unit 200 shown in FIG. 1, and FIG. 3 is a front view of the main unit 200.

As shown in FIG. 2, the main unit 200 is partitioned into right and left regions as viewed from the front side. The left region of the main unit 200 viewed from the front side is set as a first region 251, and the right region of the main unit 200 viewed from the front side is set as a second region 252.

The mother board 210 is disposed on the bottom of the first region 251, and five expansion boards 254, at a maximum, can be disposed in a region 253 adjacent to the power supply unit 230 in the second region 252. The expansion board 254 is inserted into an expansion board socket (not shown) and disposed upright on the mother board 210. An external interface plane of the expansion board 254 is exposed on the rear side of the main unit 200.

Two cooling fans 255 and 256 are disposed on the front side of the first region 251. The fan 255 cools mainly the mother board 210, whereas the fan 256 cools mainly the expansion board 254. In this embodiment, the fan 255 is larger than the fan 256 to enhance the cooling performance for the mother board 210 mounting CPU which generates much more heat. The rear side of the first region 251 is made of a metal sheet (not shown) with a plurality of holes, and these holes substantially constitute exhaust ports of the first region 251.

It is noted that an upper left corner of the first region 251 on the rear side can mount two superposed upper and lower hard disk drives 257 in such a manner that they are suspended from the upper side.

A casing 260 for accommodating the hard disk drives 221 to 224 is disposed in the second region 252 on the front side, and the power supply unit 230 is disposed in the second region 252 on the rear side.

Figure 4:
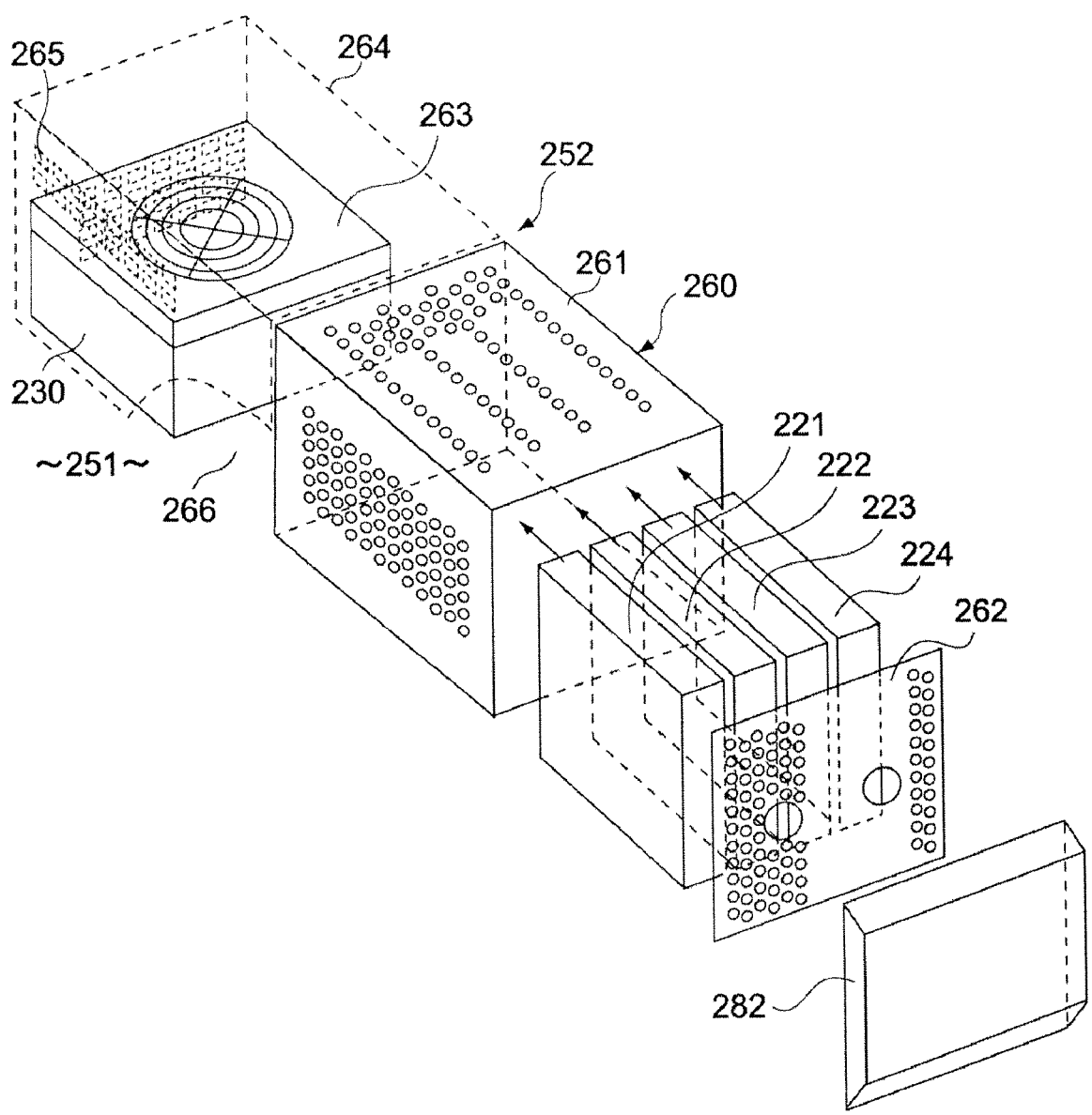
FIG. 4 is a schematic perspective view showing the structure of a second region shown in FIGS. 2 and 3.

As shown in FIG. 4, the casing 260 has a casing main body 261 and a lid 262. A metal sheet having a plurality of holes surrounds the upper, lower, right and left walls of the casing 260. The rear and front sides of the casing main body 261 are opened. The lid 262 is removably mounted at the opening of the casing main body 261 on the front side and is made of a metal sheet having a plurality of holes (these holes substantially constituting suction ports of the second region 252). The hard disk drives 221 to 224 are slid and accommodated into the casing 260 with an upright state, and connected by harnesses (not shown). Therefore, the hard disk drives 221 to 224 can be mounted/dismounted from the front side of the main unit 200 in the personal computer 100.

A cooling fan 263 is mounted on an upper portion of the power supply unit 230 disposed in the second region 252 on the rear side. The cooling fan 263 sucks air in the power supply unit 230, and the sucked air is exhausted from the rear side of the main unit 200.

The space in which the power supply unit 230 is disposed is covered with a shielding member 264 made of, e.g., PET. The shielding member is a member for partitioning, for example, the upper portion of the space in which the power supply unit 230 is disposed and the first region 251. The shielding member 264 has a number of holes 265 in an upper area corresponding to the expansion boards 254 on the side of the first region 251. Via these holes, the cooling fan 263 sucks air from the first region 251 side. The expansion boards 254 can therefore be cooled supplementarily. A recess 266 is formed through the shielding member 264 in a lower predetermined area, the harnesses (not shown) being guided from the first region 251 to the second region via this recess.

The first region 251 and second region 252 are shielded by the wall of the casing 260 on the side of the first region 251 and by the wall of the shielding member 264 on the side of the first region 251. It is therefore possible to control cooling of the first region 251 and second region 252 separately. Namely, cooling control can be performed more finely, and thus, a cooling efficiency can be improved, and noises of the fans can be reduced.

As shown in FIG. 3, in the lower front area of the main unit 200 on the first region 251 side, there are disposed sequentially in the horizontal direction an IEEE1394 port 271, four USB ports 272 to 275, an S-VIDEO terminal 276 and RCA terminals 277 to 279. The first power switch 240 is disposed in the middle front area of the main unit on the left end side (opposite to the second region 252).

Figure 5:
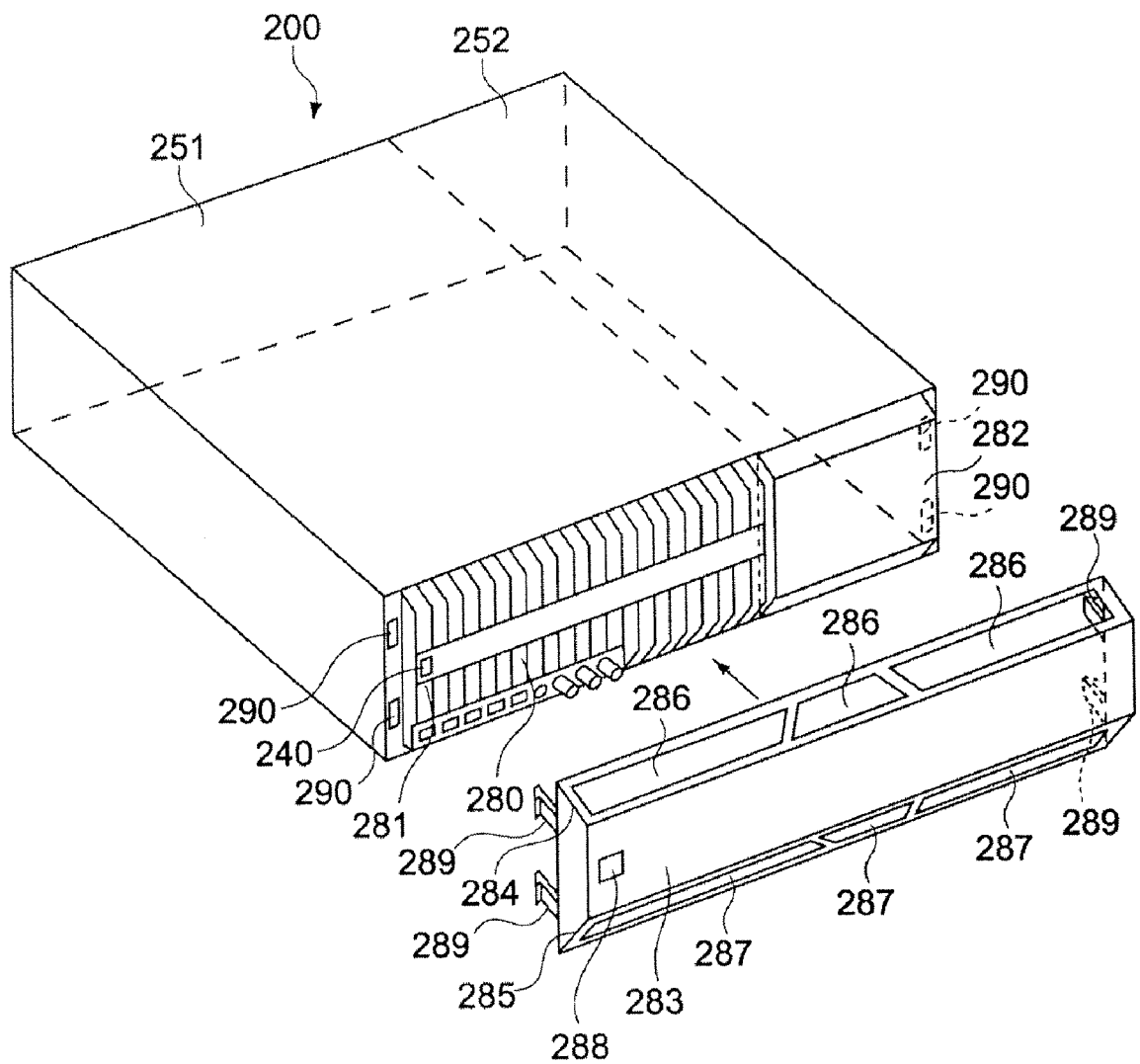
FIG. 5 is a schematic perspective view showing the outer appearance of the main unit shown in FIG. 1.

As shown in FIG. 5, on the front surface of the main unit 200 corresponding to the first region 251, a cover 280 is disposed which is made of plastic and has a number of vertically elongated holes 281 for introducing cooling air from front surface to end surface of the first region. On the front surface of the main unit 200 corresponding to the second region 252, a cover 282 made of plastic is disposed in a removable manner. The cover 282 and lid 262 correspond to a second lid.

The cover 282 is fixed to the main unit 200, for example, in such a manner that upper and lower projections (not shown) formed on the rear surface of the cover 282 at its right end (opposite to the first region 251) engage with holes (not shown) formed in the main unit 200 at corresponding positions, and that a slide switch (not shown) formed on the cover 280 at the position adjacent to the cover 282 protrudes to the cover 282 side. By dismounting the cover 282 and removing the lid 262 as shown in FIG. 4, the hard disk drives 221 to 224 can be mounted/dismounted to/from the front side of the main unit 200.

A cover 283 as a first lid is removably disposed on the front side of the main unit 200 to cover the whole front side. The cover 283 is fixed to the main unit 200 in such a manner that upper and lower projections 289 provided on the right and left rear side of the cover 283 engage with holes 290 formed at corresponding positions in the main unit 200.

The cover 283 has upper and lower tilted planes 284 and 285 each having three openings 286 and 287 respectively to enable access to the IEEE1394 port 271, USB ports 272 to 275, RCA terminals 277 to 279 and S-VIDEO terminal 276, and to allow air to flow through the openings.

A power switch 288 is disposed on the cover 283 at a position corresponding to the first power switch 240. The power switch 288 has a projection (to be later described) for abutting on the first power switch 240 on the rear side of the cover 283. By depressing the power switch 288, the projection abuts on the first power switch 240, and then the first power switch is depressed.

Figure 6:
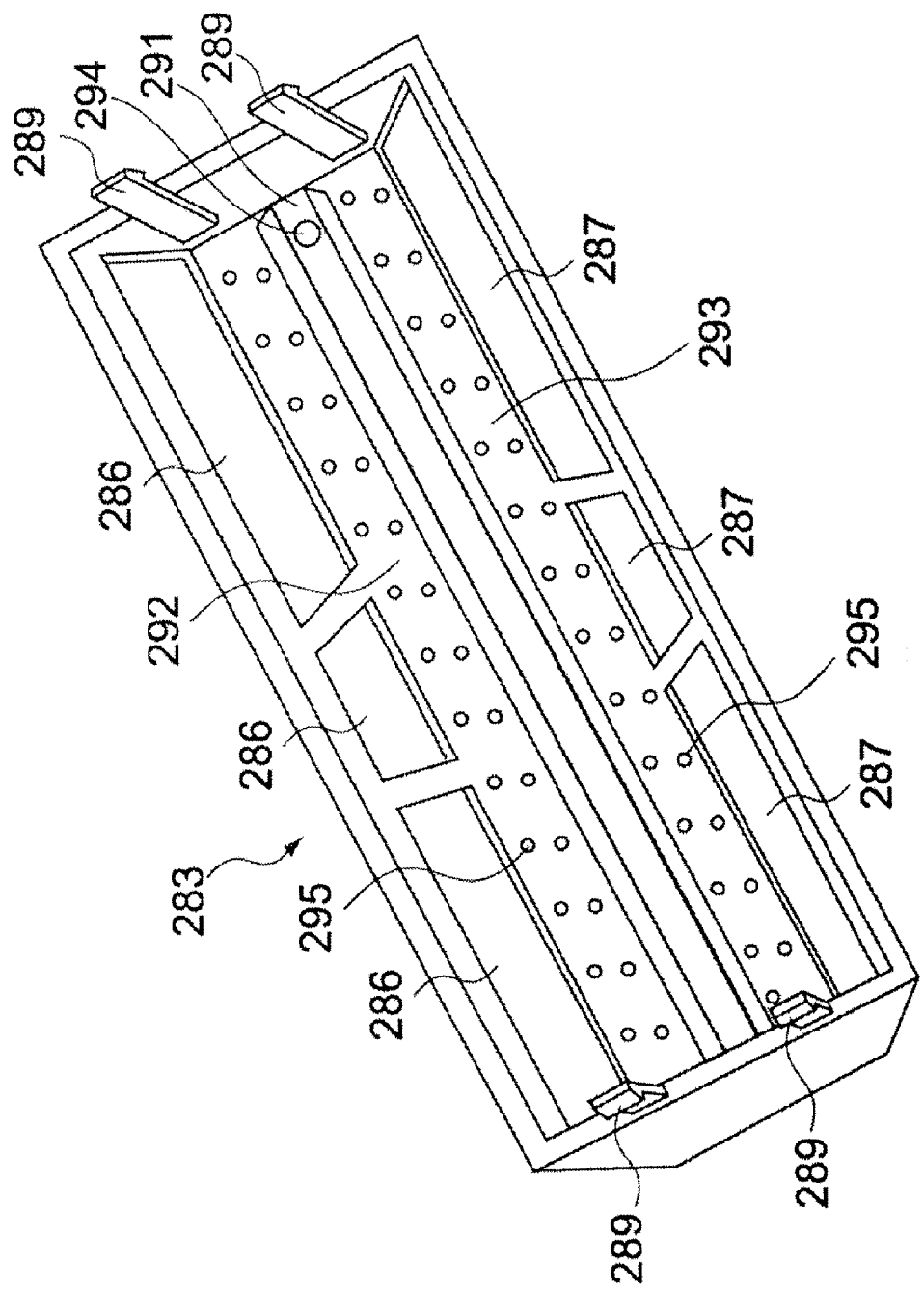
FIG. 6 is a perspective view showing the rear side of a cover covering the whole front side of the main unit shown in FIG. 5.
Figure 7:
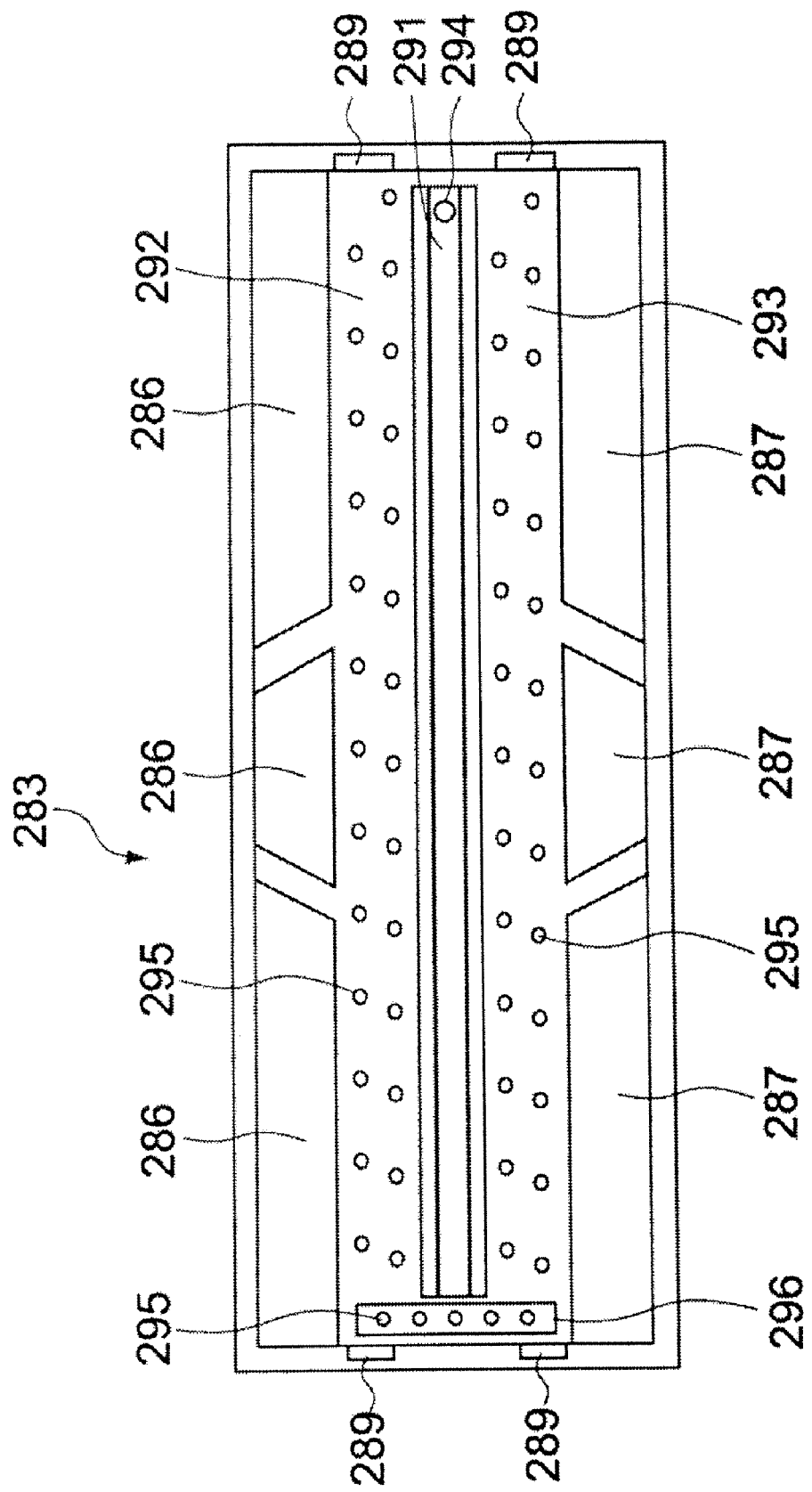
FIG. 7 is a rear view showing the rear side of the cover covering the whole front side of the main unit shown in FIG. 5.

FIG. 6 is a perspective view of the cover 283 on the rear side, and FIG. 7 is a rear view showing the rear side of the cover 283. The rear side faces the front side of the main unit 200.

As seen from FIGS. 6 and 7 and already described, three upper and lower openings 286 and 287 are disposed respectively, and two upper and lower projections 289 are formed on the rear side of the cover 283 respectively at right and left ends thereof.

A protruding portion for reinforcing step 291 is formed in the rear central area of the cover 283, such that it interconnects approximately the right and left ends of the cover 283. This step 291 separates walls 292 and 293 into upper and lower area on the rear side of the cover 283. A projection 294 which can abut on the first power switch 240 is disposed at a predetermined apex position of the step 291.

Each of the walls 292 and 293 is formed with a plurality of circular holes 295 disposed in upper and lower rows in a zigzag way. Further, a plate member 296 is disposed on the front plane of the cover 283 at the left end (which faces the second region 252) in a vertical direction, and is formed also with a plurality of holes 295 in the vertical direction.

Figure 8:
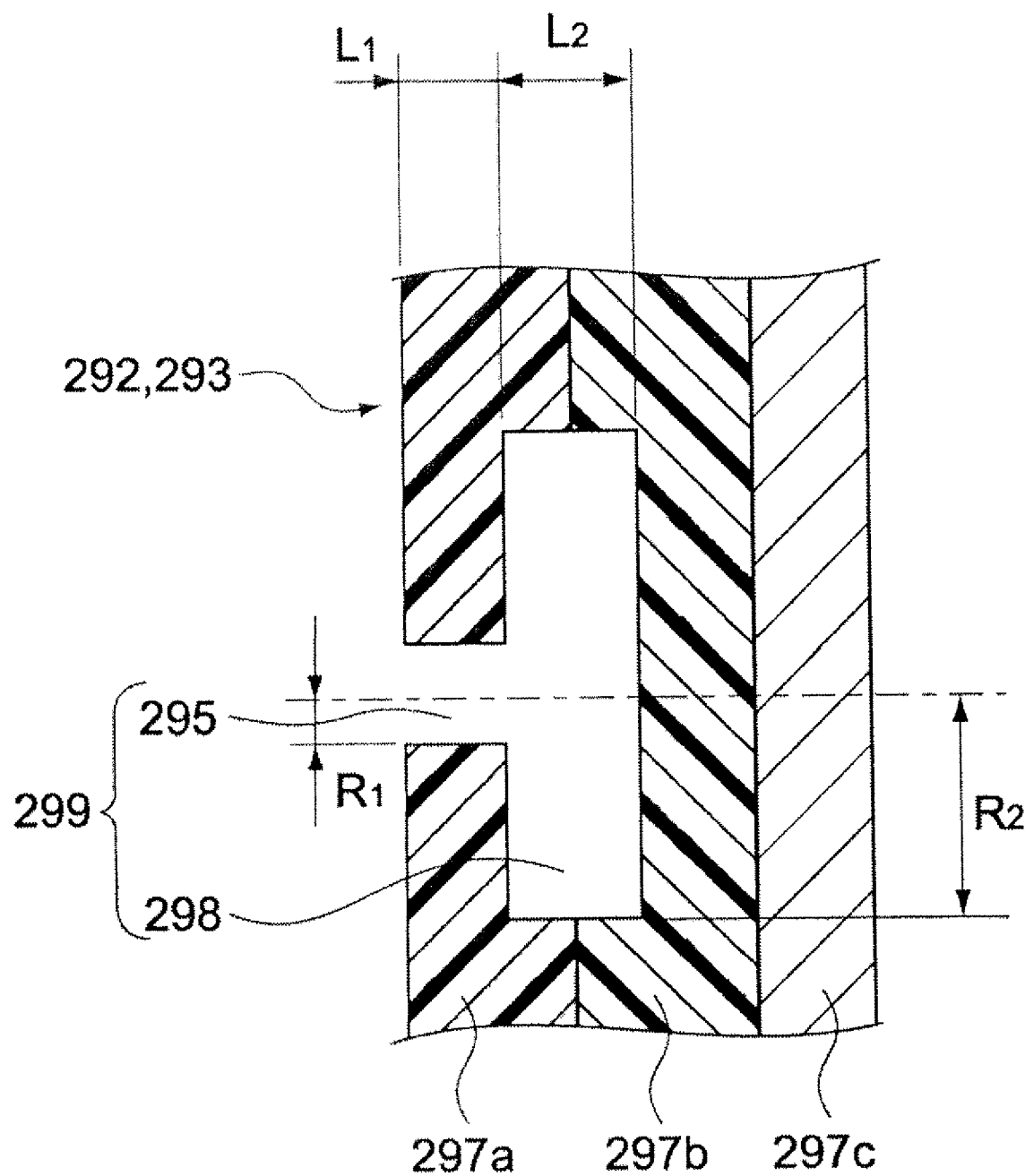
FIG. 8 is a cross sectional view showing a partial area of a wall shown in FIGS. 6 and 7.
Figure 9:
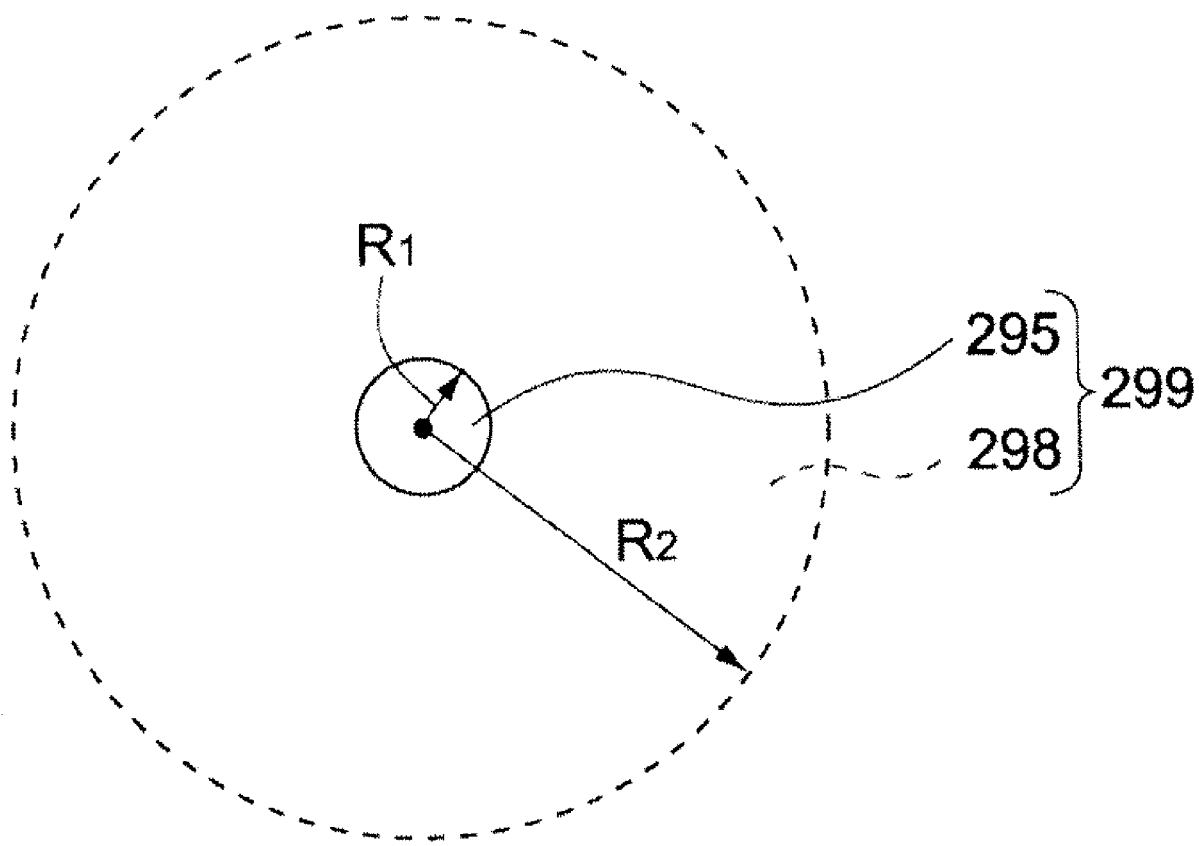
FIG. 9 is an enlarged view showing a peripheral area of a hole of the wall shown in FIGS. 6 and 7.

FIG. 8 is a partial cross sectional view showing each of the walls 292 and 293, and FIG. 9 is an enlarged view showing the peripheral area of the hole 295.

The walls 292 and 293 include a first layer 297a made of plastic, a second layer 297b made of plastic, and a third layer, or decorative plate, 297c made of aluminum and serving as a surface of the cover 283. A cylindrical cavity 298 having a diameter larger than that of the hole 295 is formed at the stacking position of the first layer 297a and second layer 297b such that it communicates with the hole 295. Since the cavity 298 is formed of stacking structure of the first layer 297a and second layer 297b made of plastic, the cavity 298 can be formed easily.

In this embodiment, a Helmholtz resonator 299 includes the hole 295 and the cavity 298 communicating with the hole 295.

The Helmholtz resonator 299 reduces noises of the hard disk drives 221 to 224. The Helmholtz resonator 299 absorbs sounds particularly at a peak noise frequency of the hard disk drives 221 to 224. In this embodiment, the Helmholtz resonator 299 is structured such that it absorbs sounds at a frequency of about 2.6 kHz. Therefore, the sizes of the hole 295 and cavity 298 are set as follows:

Radius R1 of inlet port of hole 295: 1 mm

Length L1 of inlet port of hole 295: 1 mm

Radius R2 of cavity 298: 7.5 mm

Length L2 of cavity 298: 3 mm

Volume V2 of cavity 298: 530 $mm^3$

When a sound velocity C of 340 m/s is substituted into the well-known theoretical formula of a Helmholtz resonator without taking into consideration of the hole 295:

a frequency f of 4165.596099 Hz is obtained, and when the hole 295 is considered and revised, a revised frequency fa of 2598.02498 Hz is obtained.

In this embodiment, the Helmholtz resonators 299 absorbing sounds at the peak noise frequency of the hard disk drives 221 to 224 are disposed on the rear plane of the cover 283 covering the whole front side of the main unit 200, i.e., on the walls 292 and 293 facing the front side of the main unit 200. It is therefore possible to effectively reduce noises. Specifically, since the cover 283 covers the whole front side of the main unit 200, it is possible to have a large area of the walls 292 and 293 and dispose an increased number of Helmholtz resonators 299, thereby further improving sound absorbing performance.

Further, in this embodiment, since the plate member 296 formed with a plurality of Helmholtz resonators 299 is disposed on the front plane of the cover 283 at the left end (opposite to the second region 252), i.e., at the position nearer to the hard disk drives 221 to 224, a sound abosorbing performance can be improved further.

Furthermore, since the hard disk drives 221 to 224 are covered with the cover 282 and lid 262, noises particularly at a low frequency can be reduced by the cover 282 and lid 262. In addition, the cover 283 itself substantially double-covering the front side of the main unit 200 also has the advantage of reducing noises.

The experiment results by the present inventors are as follows:

(1) The Helmholtz resonators 299 on the rear plane of the cover 283 reduced noises at a frequency near 2.6 kHz by about 1 dB.

(2) The cover 282 and lid 262 reduced noises by about 2 dB (not at a specific frequency).

(3) The cover 283 reduced noises by about 3 dB (not at a specific frequency).

It is obvious that the shape, size, , the number, the layout method and the like of the Helmholtz resonator 299 described above are only illustrative and may be modified and implemented in various forms which are included in the technical concept of an embodiment of the present invention.

Figure 10:
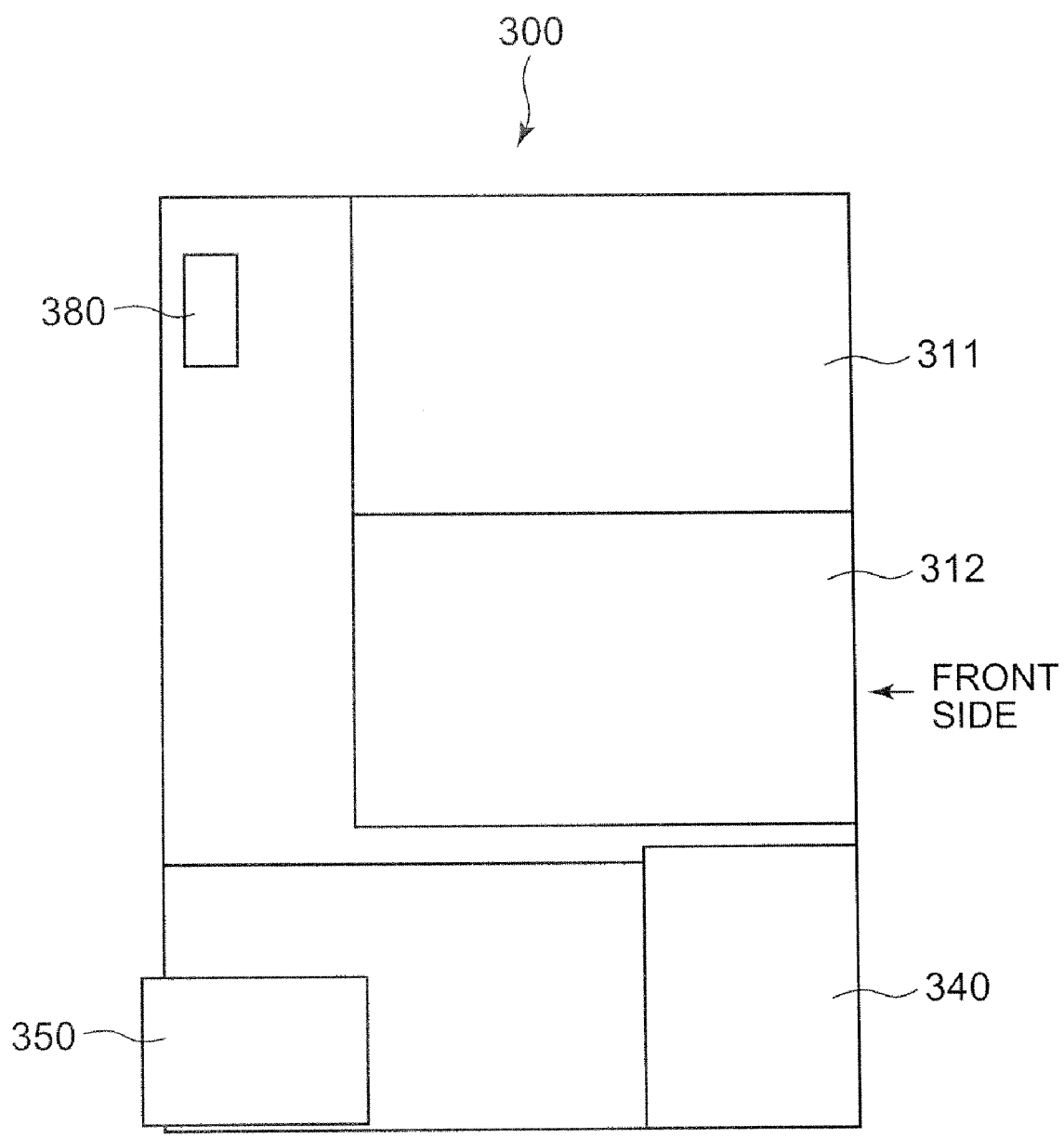
FIG. 10 is a plan view showing the internal structure of an access unit shown in FIG. 1.
Figure 11:
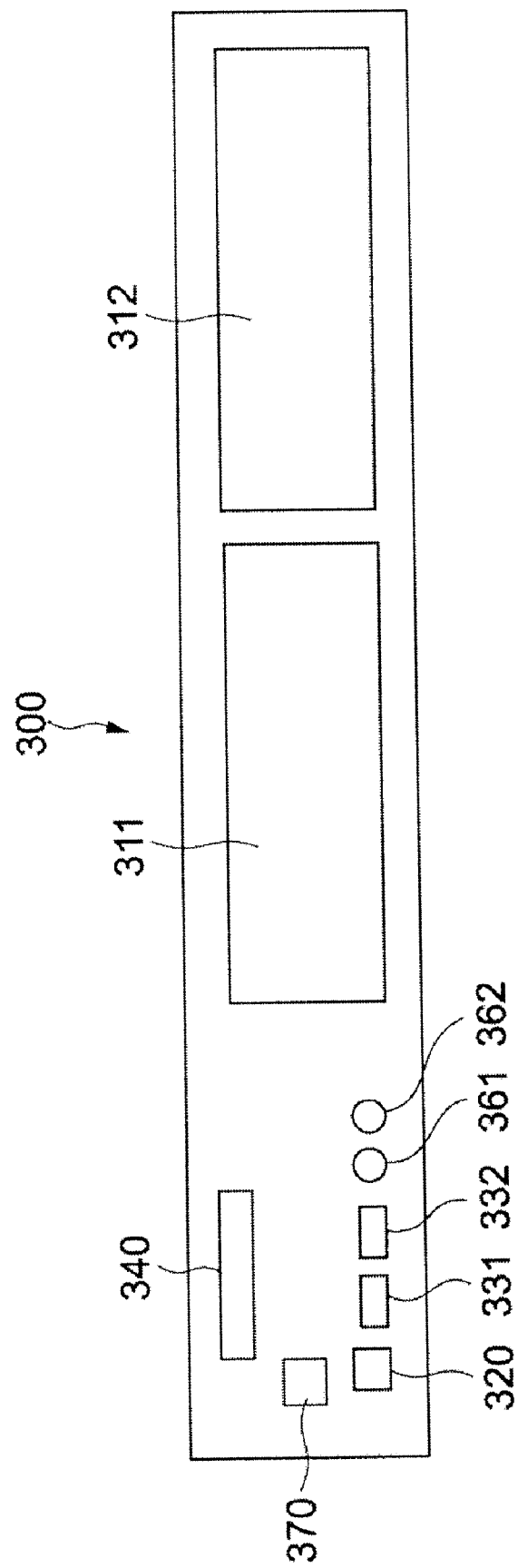
FIG. 11 is a front view of the access unit shown in FIG. 1.

FIG. 10 is a plan view showing the internal structure of the access unit shown in FIG. 1, and FIG. 11 is a front view of the access unit 300.

As shown in FIGS. 10 and 11, the two optical disc drives 311 and 312 are juxtaposed in the access unit 300 such that a recording medium can be loaded/unloaded from the front side of the access unit 300. In place of the optical disc drives 311 and 312, hard disk drives may be disposed obviously.

The IEEE1394 port 320, two USB ports 331 and 332, microphone terminal 362 and head phone terminal 361 are disposed on the front side of the access unit 300 in this order sequentially from the lower lright side. The second power switch 370 is disposed above these ports and terminals, and a card inlet port for the multi card reader 340 is disposed further above the second power switch. A card inlet port for the PCMCIA card bus 350 and the remaining two USB ports 333 and 334 are disposed on the rear side of the access unit 300. A cooling fan 380 is disposed on the rear side of the access unit 300 and at the back of the optical disc drives 311 and 312.

It is noted that the cable 400 for interconnecting the main unit 200 and access unit 300 is arranged to be connected to cable connectors (not shown) disposed on the rear sides of the main unit 200 and access unit 300 respectively.

Figure 12:
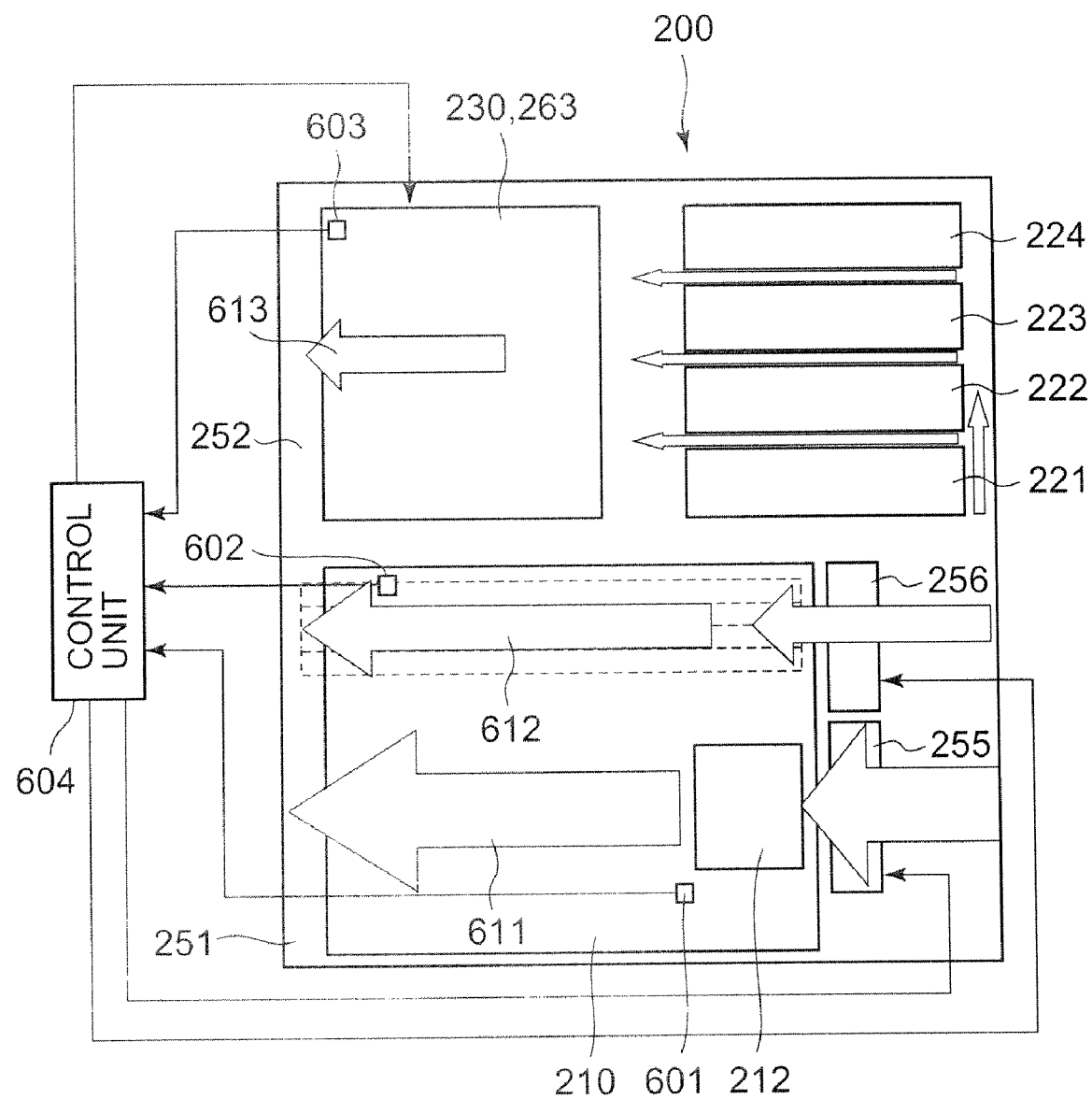
FIG. 12 is a diagram for illustrating the flow of cooling air in the main unit shown in FIG. 1.

FIG. 12 is a plan view conceptually showing the structure of a cooling control system and the flow of cooling air in the main unit 200.

A CPU 212 is disposed on the mother board 210 in the first region 251 of the main unit 200, and the fan 255 is disposed to the side of the CPU. A temperature sensor 601 is disposed near the CPU 212 to detect a temperature in the first region 251, particularly a temperature around the CPU 212. A temperature sensor 602 is disposed near expansion board sockets on the mother board 210 to detect a temperature in the first region 251, particularly a temperature around the expansion boards. A temperature sensor 603 is disposed in the power supply unit 230 in the second region 252 of the main unit 200 to detect a temperature in the second region 252, particularly a temperature in the power supply unit 230 and a temperature of incoming air.

The detection results by the temperature sensors 601 to 603 are sent to a control unit 604 mainly constituted of the CPU 212. In accordance with the detection results, the control unit 604 controls the revolution speed of each of the fans 255, 256 and 263 such that the temperatures in each area 251 and 252 and the like do not exceed predetermined temperatures.

In the main unit 200, the first region 251 and second region 252 are substantially shielded as described above, and cooled by using different fans. In addition, in the first region 251, the region is partitioned into two regions to be cooled separately by the two fans 255 and 256.

There arises therefore three main flows of cooling air in the main unit 200 as shown in FIG. 12. The flows include: a flow 611 of cooling air generated by the fan 255 and flowing from the front side to rear side of the main unit 200 including CPU 212 in the first region; a flow 612 of cooling air generated by the fan 256 and flowing from the front side to rear side of the main unit 200 including the expansion boards in the first region; and a flow 613 of cooling air generated by the fan 263 and flowing from the front side to rear side of the main unit 200 in the second region 252. In the second region 252, since the front side is covered with the cover 282 with no holes for air ventilation, air flows from the front side of the first region 251 to the back (front side of the casing 260) of the cover 282 and flows into the second region 252.

In the personal computer 100 constructed as above, for example, the mother board 210 and power supply unit 230, which have a high calorific value and are hardly touched directly with hands of a user, are disposed in the main unit 200, and the optical disc drives 311 and 312 and multi card reader 340, which are drives for removable recording media with a low calorific value and having a large number of user accesses, are disposed in the access unit 300. Further, the power switches are provided in both the main unit 200 and access unit 300. Accordingly, it is possible to improve the degree of freedom of device layout in the personal computer 100 to perform cooling efficiently, and thus ON/OFF power source operation of personal computer 100 becomes easy. Since it is anticipated that the access unit 300 in particular is installed at a position near a user, user operation can be improved considerably with the power switch provided in the access unit 300. The degree of freedom of device layout in the personal computer 100 means that, for example, the main unit 200 is constructed by disposing the mother board 210 in the first region 251, and disposing the power supply unit 230 or hard disk drives 221 to 224 in the second region 252, and , for example, shielding these regions.

Further, in the personal computer 100, the access unit 300 is supplied with power from the power supply unit 230 of the main unit 200. Data is transferred between the main unit 200 and access unit 300, and also power is supplied from the power supply unit 230 of the main unit 200 to the access unit 300 by using a single cable 400. It is therefore possible to simplifying wirings. Namely, if the optical disc drives 311 and 312 or multi card reader 340 provided in the access unit 300 are structured as discrete apparatus and connected to the main unit 200 respectively, it is necessary to use a large number of data lines and power lines. In contrast, in this embodiment, it is sufficient to use only one cable 400.

It is noted that the present invention is not limited to the above-described embodiment, but various modifications may be implemented without departing from the technical concept of the present invention.

Figure 13:
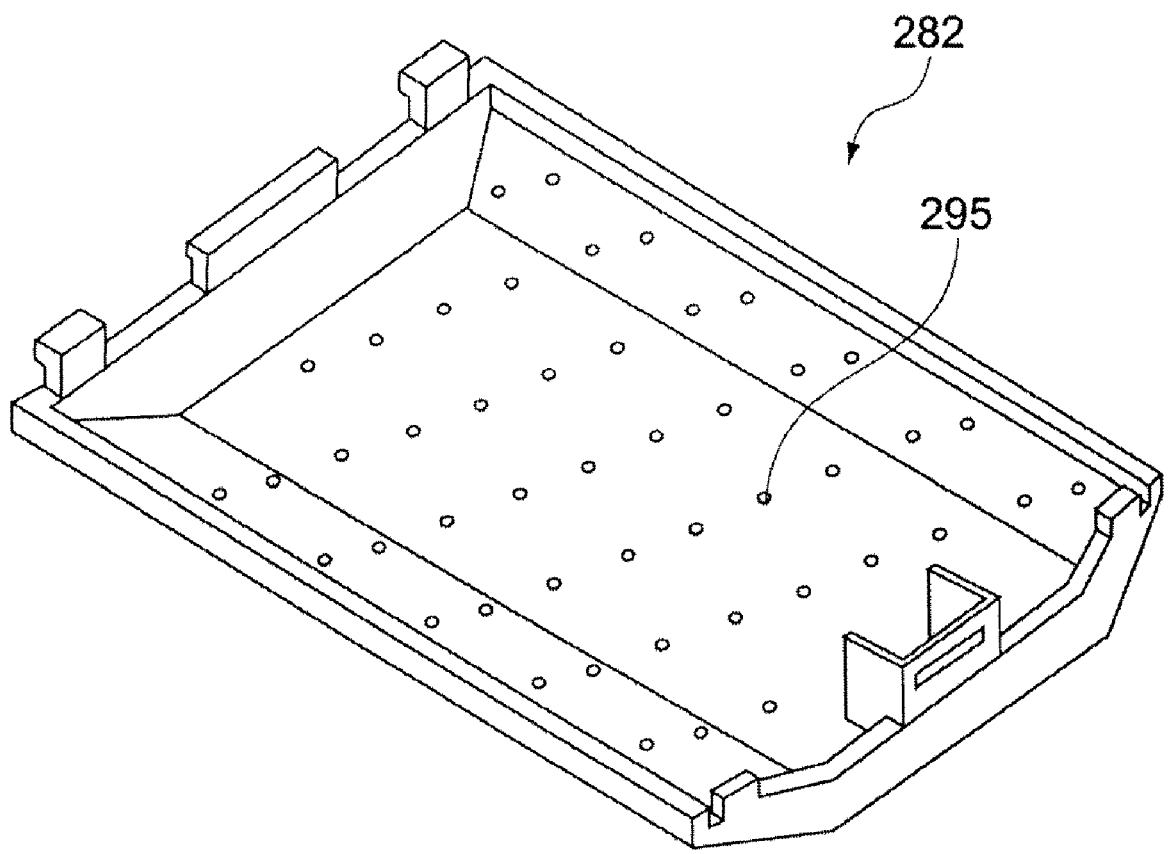
FIG. 13 is a perspective view showing the rear side of a cover covering openings through which hard disk drives are mounted or dismounted according to another embodiment.
Figure 14:
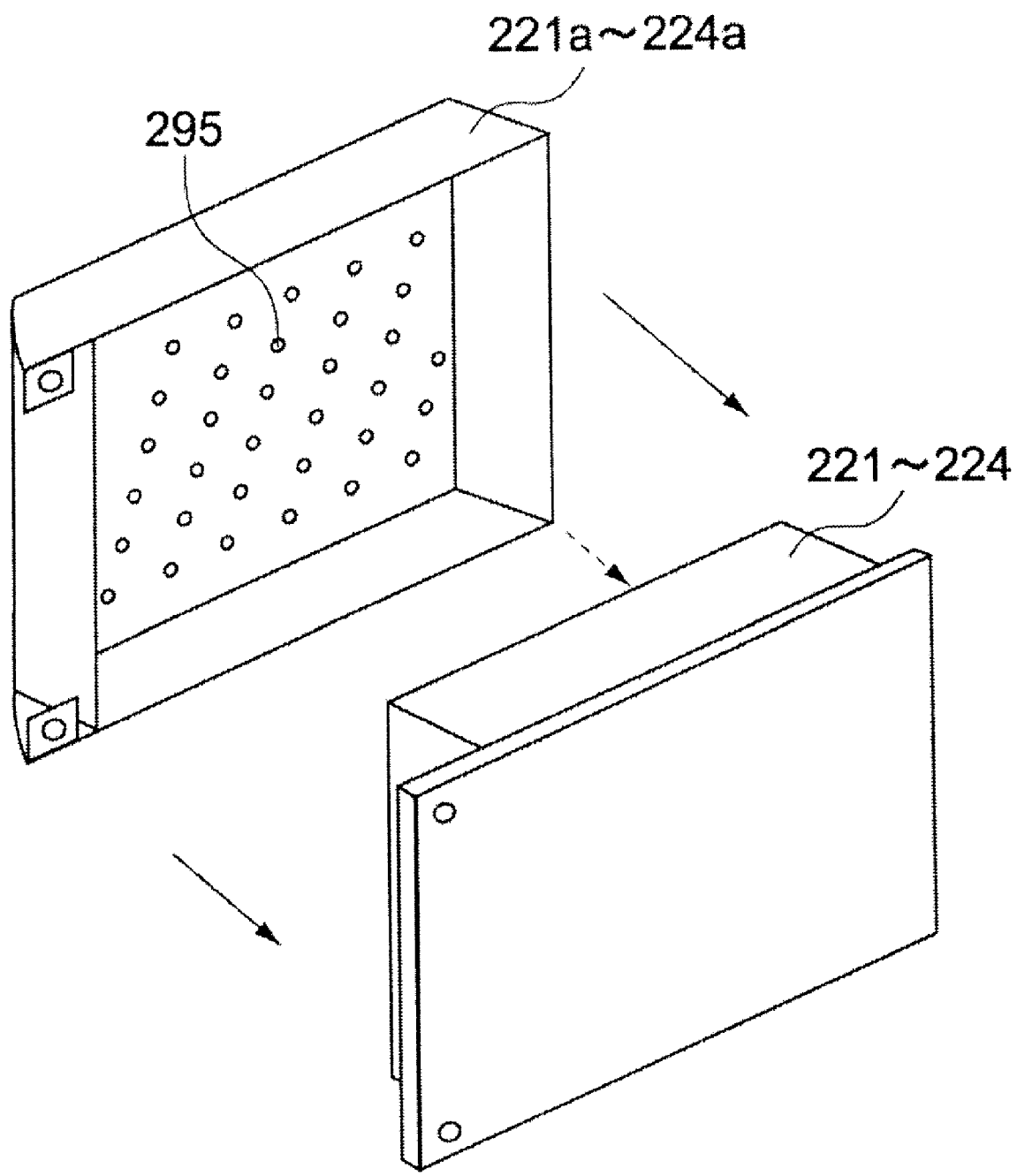
FIG. 14 is a perspective view of a case for accommodating a hard disk drive according to another embodiment.

In the embodiment, although the Helmholtz resonators 299 are mounted on the rear side of the cover 283 of the main unit 200, a number of holes 295 may be formed on the rear side of the cover 282 covering the openings for mounting/dismounting the hard disk drives 221 to 224 as shown in FIG. 13, to thereby provide Helmholtz resonators 299 having the same structure as that shown in FIGS. 8 and 9. In this case, since the Helmholtz resonators 299 are disposed on the cover 282 which is nearer to the hard disk drives 221 to 224 than the cover 283 of the main unit 200, noises at a specific frequency can be absorbed more efficiently.

Also, a number of holes 295 may be formed on the rear side of cases 221*a* to 224*a* for accommodating the hard disk drives 221 to 224, i.e., in the plane facing the hard disk drives 221 to 224 to dispose the Helmholtz resonators 299 with a structure similar to that of FIGS. 8 and 9. In this case, since the Helmholtz resonators 299 are disposed on the cases 221*a* to 224*a* at the position nearest to the hard disk drives 221 to 224, noises at a specific frequency can be absorbed much more efficiently.

Further, in the embodiment, although the hard disk drive is used as an example of a drive, obviously an embodiment of the present invention is also applicable to other recording media such as a drive for driving an optical disc.

According to an embodiment of the present invention, noises generated from the drive can be reduced substantially while the drive is kept compact and light.

It should be understood by those skilled in the art that various modifications, combinations, sub-combinations and alterations may occur depending on design requirements and other factors insofar as they are within the scope of the appended claims or the equivalents thereof.

CROSS REFERENCE TO RELATED APPLICATION

The present document contains subject matter related to Japanese Patent Application No. 2006-270617 filed in the Japanese Patent Office on Oct. 2, 2006, the entire content of which being incorporated herein by reference.

What is claimed is:

1. An electronic apparatus comprising:
   a drive for recording/reproducing a recording medium;
   a sound absorbing member having a Helmholtz resonator for absorbing sounds at a predetermined frequency among sounds generated by the drive; and
   a removably mounted first lid that includes an outer surface facing away from the electronic apparatus and an inner surface facing towards the electronic apparatus, the first lid covering a front side of the electronic apparatus from a first side edge of the electronic apparatus to a second side edge of the electronic apparatus,
   wherein the sound absorbing member with the Helmholtz resonator is provided in a plane on the inner surface of the first lid and extends from approximately the first side edge to approximately the second side edge of the electronic apparatus and further comprising a second lid removably mounted at an opening on the front side of the electronic apparatus, the second lid having a length that extends a distance across the front side of the electronic apparatus less than a distance extended by the first lid, the drive can be mounted/dismounted via the opening provided on a front side of the electronic apparatus, wherein the second lid covers the drive when the drive is mounted in the electronic apparatus, and wherein the first lid encloses the second lid when the first lid is mounted to the electronic apparatus.

2. The electronic apparatus according to claim 1, wherein: the drive is a hard disk drive.

3. The electronic apparatus according to claim 1, wherein: the drive can be mounted/dismounted via an opening provided on a front side of the electronic apparatus.

4. The electronic apparatus according to claim 1, wherein: a suction port is provided on the front side of the electronic apparatus to introduce cooling air into the electronic apparatus; and
   the electronic apparatus further includes a cooling fan disposed in the electronic apparatus near the suction port.

5. The electronic apparatus according to claim 1, further comprising:
   a second lid removably mounted at the opening on the front side of the electronic apparatus.

6. The electronic apparatus according to claim 5, wherein: the second lid is composed of a metal lid or a plastic lid.

7. The electronic apparatus according to claim 1, further comprising:
   a case which accommodates the drive having the sound absorbing member provided on a plane facing to the drive.

8. A sound insulating method for an electronic apparatus comprising a step of:
   absorbing sounds at a predetermined frequency among sounds generated by the drive, with a Helmholtz resonator,
   covering a whole front side of the electronic apparatus with a removably mounted first lid that includes an outer surface facing away from the electronic apparatus and an inner surface facing towards the electronic apparatus,
   wherein the sound absorbing member with the Helmholtz resonator is provided in a plane on the inner surface of the first lid and extends from approximately a first side edge of the electronic apparatus to approximately a second side edge of the electronic apparatus and further comprising providing a second lid removably mounted at an opening on the front side of the electronic apparatus, the second lid having a length that extends a distance across the front side of the electronic apparatus less than a distance extended by the first lid, the drive can be mounted/dismounted via the opening provided on a front side of the electronic apparatus, covering the drive with the second lid when the drive is mounted in the electronic apparatus, and enclosing the second lid with the first lid when the first lid is mounted to the electronic apparatus.

9. An electronic apparatus comprising:
   at least one drive for recording/reproducing a recording medium, the at least one drive can be mounted/dismounted via an opening provided on a front side of the electronic apparatus;
   a removably mounted first lid that includes an outer surface facing away from the electronic apparatus and an inner surface facing towards the electronic apparatus, the first lid extending from a first side of the electronic apparatus to a second side of the electronic apparatus;
   a second lid removably mounted on the front side of the electronic apparatus, the second lid having a length that extends a distance across the front side of the electronic apparatus less than a distance extended by the first lid, the second lid covering the at least one drive when the drive is mounted in the electronic apparatus;

a sound absorbing member having a Helmholtz resonator for absorbing sounds at a predetermined frequency among sounds generated by the drive, wherein the sound absorbing member with the Helmholtz resonator is provided in a plane on the inner surface of the first lid and extends from approximately a first side edge of the electronic apparatus to approximately a second side edge of the electronic apparatus, wherein the first lid encloses the second lid when the first lid is mounted to the electronic apparatus.

10. The electronic apparatus according to claim 9, wherein the second lid is composed of a metal lid or a plastic lid.

11. The electronic apparatus according to claim 10, further comprising:

a case which accommodates the at least one drive, the case including a main case body and a case lid, wherein the second lid covers the case lid when the at least one drive is mounted in the electronic apparatus.

12. The electronic apparatus according to claim 9, wherein the first lid includes a plurality of openings on a top edge and a bottom edge.

* * * * *